United States Patent [19]

Akeel et al.

[11] Patent Number: 5,421,218

[45] Date of Patent: * Jun. 6, 1995

[54] ELECTRIC ROBOT FOR USE IN A HAZARDOUS LOCATION

[75] Inventors: Hadi A. Akeel, Sterling Heights; Antoni J. Malarz, Troy, both of Mich.

[73] Assignee: FANUC Robotics North America, Inc., Auburn Hills, Mich.

[ * ] Notice: The portion of the term of this patent subsequent to Jan. 15, 2008 has been disclaimed.

[21] Appl. No.: 613,115

[22] Filed: Nov. 13, 1990

Related U.S. Application Data

[63] Continuation of Ser. No. 370,123, Jun. 20, 1989, Pat. No. 4,984,745, which is a continuation of Ser. No. 183,452, Apr. 14, 1988, abandoned, which is a continuation of Ser. No. 928,641, Nov. 6, 1986, abandoned, which is a continuation of Ser. No. 692,996, Jan. 22, 1985, abandoned.

[51] Int. Cl.$^6$ ............................................. B25J 19/00
[52] U.S. Cl. ................... 74/490.02; 414/735; 901/23; 901/43; 901/49
[58] Field of Search ............ 414/4, 8, 730, 735, 414/744.1, 744.6, 744.7; 901/15, 23, 24, 38, 43, 49; 310/88; 239/587; 74/479 BP, 479 BE

[56] References Cited

U.S. PATENT DOCUMENTS

| | | |
|---|---|---|
| 3,007,097 | 10/1961 | Shelley et al. . |
| 3,247,978 | 4/1966 | Neumeier . |
| 3,447,000 | 5/1969 | Dugan et al. . |
| 3,606,162 | 9/1971 | Lehmann . |
| 3,819,846 | 6/1974 | Jakobsen . |
| 4,149,935 | 4/1979 | Fields et al. . |
| 4,278,046 | 7/1981 | Clark et al. . |
| 4,398,863 | 8/1983 | Shum . |
| 4,407,625 | 10/1983 | Shum . |
| 4,424,472 | 1/1984 | Jacot-Oescombes . |
| 4,424,473 | 1/1984 | Gorman . |
| 4,460,826 | 7/1984 | Pryor . |
| 4,507,046 | 3/1985 | Sugimoto et al. . |
| 4,555,216 | 11/1985 | Buschor . |
| 4,557,662 | 12/1985 | Terauchi et al. . |
| 4,568,238 | 4/1986 | Hirano et al. . |
| 4,601,635 | 7/1986 | Ito et al. . |
| 4,984,746 | 1/1991 | Akeel et al. ............ 901/43 X |

FOREIGN PATENT DOCUMENTS

| | | |
|---|---|---|
| 5615686 | 2/1956 | Japan . |
| 55-106786 | 8/1980 | Japan . |
| 59-92053 | 5/1984 | Japan . |
| 59-160193 | 10/1984 | Japan . |

*Primary Examiner*—Donald W. Underwood
*Attorney, Agent, or Firm*—Brooks & Kushman

[57] ABSTRACT

A multi-axis electric spraying robot adapted for use in a hazardous environment includes a base having a first pressurized compartment and an arm assembly having a second pressurized compartment in which compartments electric motors are respectively located. The arm assembly is supported for movement on the base at one end thereof. The arm assembly includes a wrist adapted for connecting the opposite end of the arm assembly with a spraying tool. One electric motor is provided to drive each axis. The compartments are pressurized to prevent flammable gases or vapors from entering the first and second compartments during operation of the robot.

8 Claims, 6 Drawing Sheets

ELECTRIC ROBOT FOR USE IN A HAZARDOUS LOCATION

This is a continuation of application Ser. No. 07/370,123, filed on Jun. 20, 1989, now U.S. Pat. No. 4,984,745, which is a continuation of Ser. No. 07/183,452, filed Apr. 14, 1989; now abandoned; which is a continuation of Ser. No. 06/928,641, filed Nov. 6, 1986, abandoned; which is a continuation of Ser. No. 06/692,996, filed Jan. 22, 1985, abandoned.

TECHNICAL FIELD

This invention relates to electrically driven robots adapted for use in hazardous ambients and, in particular, electrically driven robots which can operate in an environment containing flammable gases or vapors.

BACKGROUND ART

Many spray painting machines have been introduced to paint mass-produced items such as automotive bodies. Such paint spraying machines have typically been limited in their use in that they must be backed up by human operators, who must touch up areas missed by the machines. Such machines also tend to be wasteful of paint and are only designed to paint with horizontal and/or vertical paths on a reciprocator system. Coating an object fully, especially if it has complex contours, requires movements in depth as well as lateral movements. The use of a wrist is significant in that it is often necessary for an operator to angle a paint spray gun in a particular manner to deposit paint on a heavily contoured surface.

Many of the prior art spray painting machines include a battery of spray guns fed from large capacity, centralized paint reservoirs which manage to paint a large percentage of the exterior surface to be covered. Less accessible areas, such as wheel arches, the interiors of the trunk or engine compartment and door edges had to be painted by operators who looked for unpainted areas as the car body left the automatic painter.

Numerous prior art patents disclose painting machines including electrical painting apparatus such as the U.S. Pat. No. to Chapman 2,858,947; the U.S. Pat. No. to Shelley et al 3,007,097; the U.S. Pat. No. to Pierson et al 3,481,499; the U.S. Pat. No. to Richter 4,030,617; the U.S. Pat. No. to Yoshio 4,113,115; the U.S. Pat. No. to Burns et al 4,196,049; the U.S. Pat. Nos. to Shum 4,398,863 and 4,407,625; the U.S. Pat. No. to Jacot-Descombes et al 4,424,472 and the U.S. Pat. No. to Gorman 4,424,473. The U.S. Pat. Nos. to Pollard 2,213,108 and 2,286,571 both disclose electrical robots for paint spraying. The U.S. Pat. No. to Stricker 4,170,751 likewise discloses an electric apparatus associated with paint spraying robots.

There are many reasons for using spraying robots to provide high-quality painted finishes on a mass-produced item. Robots are desirable in that they are able to cope with the hostile painting environment; they allow the painting process to proceed with less total energy being expended; and they improve paint quality which, in turn, will eventually result in reduced material and labor costs. The above advantages are particularly important in painting car bodies where production rates are expected to be high, and there is a relatively small amount of time available for the paint to be applied and completed in not one, but several coats.

A spraying robot can also be used in the enameling and/or powdering of surfaces. For example, application of vitreous enamel to plastic bathtubs utilizes many of the same spray techniques as used in the application of paint to an automotive body.

Robots which have been used for spray painting comprise continuous path machines which emulate the action of a human operator. Such robots are typically taught by having an expert painter lead each robot in its learning mode through an actual paint job.

The average spray booth in the automotive industry has been standardized to have a relatively small width. This small width restricts the size and movements of any robot which is to be used in such a spray booth. Redesigning the existing spray booth is cost prohibitive.

Because of the limited size available for a robot in a conventional paint spray booth, the use of a robot having electrical drives is, at first blush, desirable due to the cost advantage that small electrical robots enjoy over small hydraulically-driven robots. Such costs not only include the cost of the robot, but also installation, maintenance and other operational expenses. However, in paint spraying and other similar applications the environment favors the use of hydraulically or pneumatically driven equipment. Such environment presents an explosion hazard to electrical motors and the electrical robot must either be explosion proof or intrinsically safe so as not to ignite the combustible environment. A hydraulically-driven robot does not utilize the amount of electrical energy typically sufficient to ignite the explosive fuel-air mixture.

Electrical equipment which is to be located in areas classified as "hazardous" (i.e. a Class 1, Division 1 location) by Article 500 of NFPA 70, Natural Electrical Code, either must be placed in pressurized containers or must be made explosion proof. If this is done the area immediately around the electrical equipment is no longer classified as a Class 1, Division 1 location, but rather a Class 1, Division 2 location wherein only the location adjacent the enclosure or explosion proof container contains the ignitable concentration of flammable gases or vapors under normal operating conditions. The pressurization of the enclosure entails supplying the enclosure with clean air or an inert gas with or without continuous flow at sufficient pressure to prevent the entrance of combustible gases or vapors which might occasionally be communicated into the enclosure. If the enclosure is maintained under a positive pressure of at least 25 pascals (0.1 inches of water) when the electric equipment is energized, the risk of an explosion in the "hazardous" environment is substantially eliminated.

One way of complying with the above standard is to make the containers for the equipment, such as motors, explosion-proof. However, the use of explosion-proof motors not only increases the cost of the motors, but also increases the weight and size of the robot. Also, the use of explosion-proof motors necessitates the use of explosion-proof cables. Such cables not only are more costly and heavier, but also are more inflexible and unwieldly. Such explosion-proof motors and cables also take up valuable space in or on the robot and, consequently, in the paint spray booth.

DISCLOSURE OF THE INVENTION

An object of the present invention is to provide an improved electrically driven robot adapted for use in a hazardous environment.

Another object of the present invention is to provide a relatively compact robot adapted for use in a hazardous environment and which includes a pair of pressurized compartments for housing electric motors therein.

Yet still another object of the present invention is to provide a relatively compact and inexpensive electrically driven robot adapted for use in hazardous environments, including a base, an arm assembly and first and second drive systems including first and second electric motors, respectively, and wherein at least one electric motor is located in a first pressurized compartment located in the base and at least one electric motor is located in a second pressurized compartment located in the arm assembly.

In carrying out the above objects and other objects of the present invention an electrically driven robot constructed in accordance with the present invention includes a base having a first pressurized compartment contained therein, and an arm assembly having a second pressurized compartment contained therein. The arm assembly is supported for movement on the base at one end thereof. The arm assembly includes a wrist adapted for connecting its opposite end with a fluid delivery tool. The robot also includes first and second drive systems. The first drive system includes at least one electric motor located in the first pressurized compartment to drive the arm assembly. The second drive system includes at least one electric motor located in the second pressurized compartment to drive the wrist.

Preferably, the electric motors comprise brushless servo motors commonly known as brushless D.C. motors or AC servo motors.

Also, preferably, the robot includes cables which are housed in a pressurized conduit attached to the outer surface of the base. The cables are electrically coupled to the electric motors and adapted to be coupled to a robot controller. The conduit is in fluid communication with first and second pressurized compartments. Consequently, the cables may comprise regular duty cables rather than heavy duty, explosion-proof cables.

Pressurizing means includes a pressure regulator that provides a positive pressure in the first and second compartments and also, preferably, in the conduit.

An electric spraying robot constructed in this fashion is not only relatively small and lightweight, but also less costly than comparable hydraulically-driven robots. The electric spraying robot also includes regular duty cables and does not necessitate the use of heavy duty, explosion-proof cables and their attendant disadvantages. The use of a pair of pressurized compartments, one of which is located in the arm assembly, minimizes the amount of gearing or other mechanisms required therein to transfer the rotary motion of the drive motors to a wrist mechanism mounted on the free end of the arm assembly.

Other advantages of the present invention will be readily appreciated as the same becomes better understood by reference to the following detailed description when considered in connection with the accompanying drawings.

BEST MODE FOR CARRYING OUT THE INVENTION

Figure 1:
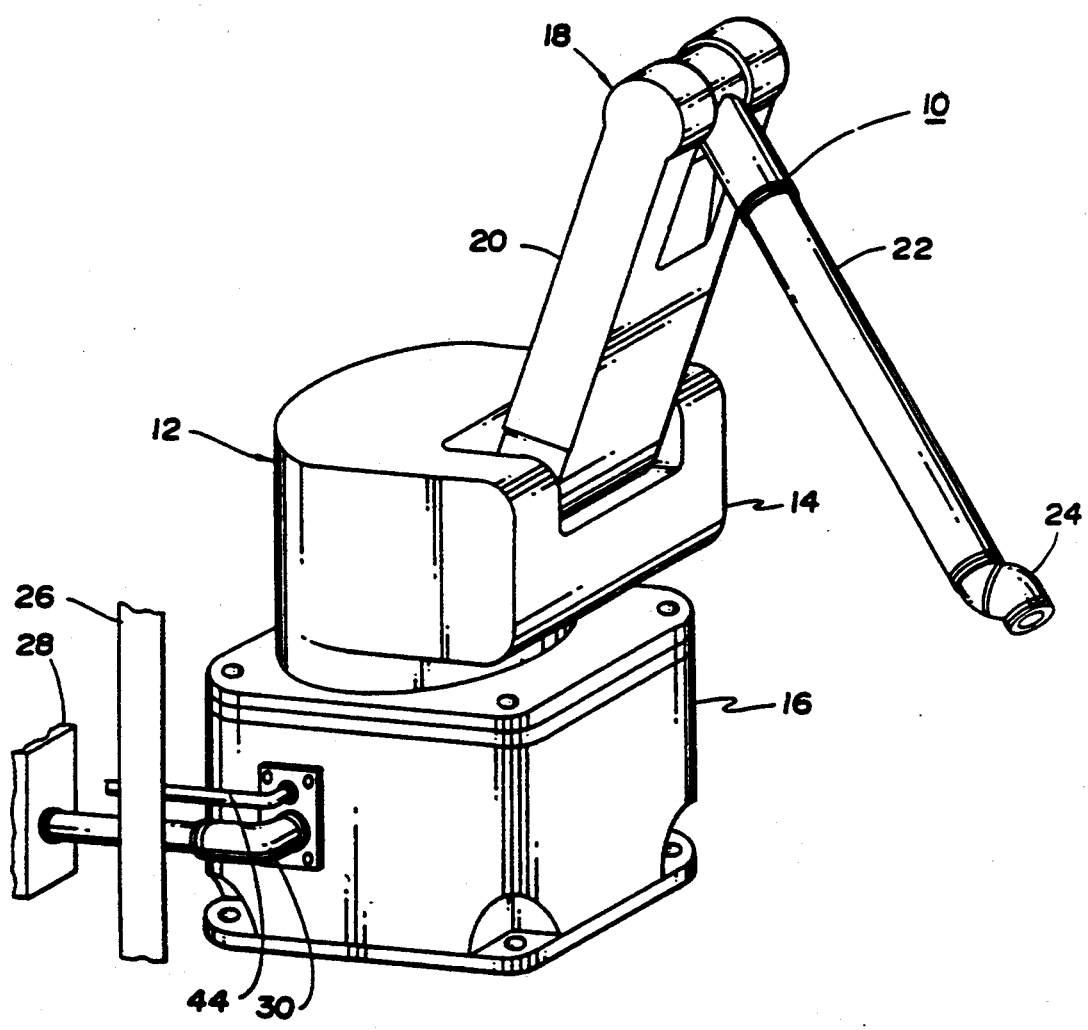
FIG. 1 is a perspective view of an electric spraying robot constructed in accordance with the present invention.

Referring now to FIG. 1 there is illustrated a paint spray robot constructed in accordance with the present invention and collectively indicated by reference numeral 10. The spray robot 10 includes a base, generally indicated at 12 having an upper base section 14 and a lower base section 16. The upper base section 14 is rotatable with respect to the stationary lower base section 16. The robot 10 also includes an arm assembly, generally indicated at 18, including an inner arm 20 pivotally connected to the upper base section 14 at one end thereof and to an outer arm 22 at its opposite end thereof. A wrist or wrist mechanism 24 is connected at the free end of the outer arm 22 and preferably comprises a three-axis wrist mechanism. The wrist mechanism 24 is adapted to hold a spraying tool, such as a paint spray gun at its free end thereof.

As described in greater detail hereinafter, the robot 10 includes an air system for pressurizing the base 12 and the arm assembly 18 so that non-sparking electric motors can be located within pressurized compartments located therein without requiring the use of explosion-proof electric motors. Also, because the electric motors for driving the wrist mechanism 24 are located in the arm assembly 18, and not the base 12, the amount of gearing required to interconnect the electric motors with the wrist mechanism 24 is substantially reduced. It is obvious that the second pressurized compartment can be located within the inner arm 20 as described herein, or within the outer arm 22 if desired.

Figure 2:
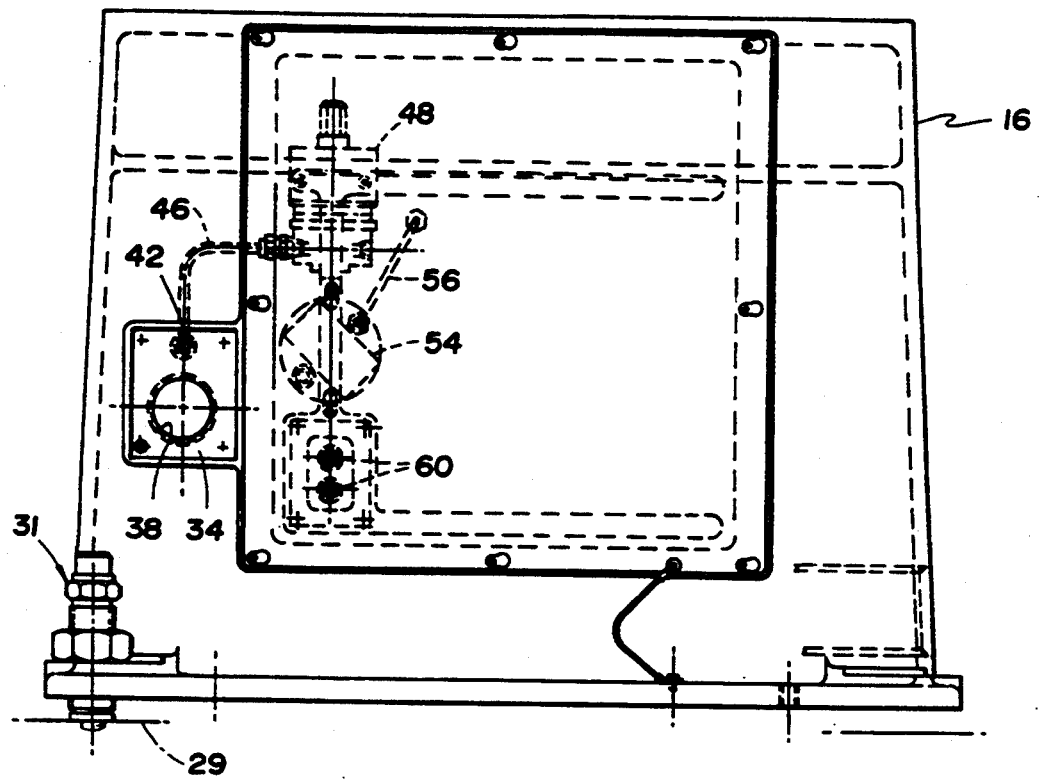
FIG. 2 is a side elevational view of a lower base section of the robot of FIG. 1.
Figure 3:
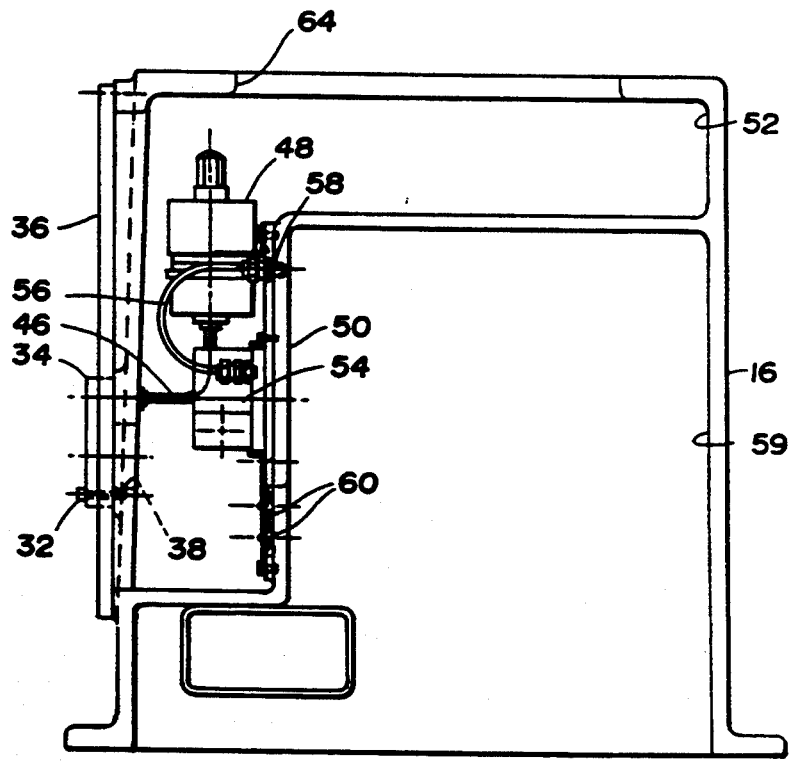
FIG. 3 is a broken-away, side elevational view of the lower section of FIG. 2 illustrating various components contained therein.

As illustrated in FIG. 1, the robot 10 is adapted for use in a hazardous ambient or environment such as within a paint spray booth, a wall of which is illustrated at 26. The lower base section 16 is adjustably mounted on the floor 29 of the paint spray booth by leveling jack assemblies 31 located at each lower corner of the lower base section 16, as best shown in FIG. 2.

The area within the paint spray booth is an area where flammable gases or vapors may be present in the air in concentrations sufficient for the location to be classified as hazardous as defined by Article 500 of the NFPA 70, National Electrical Code. Such an environment may present an explosion or fire hazard arising from the highly flammable nature of the explosive solvent-air mixture contained therewithin.

Figure 4:
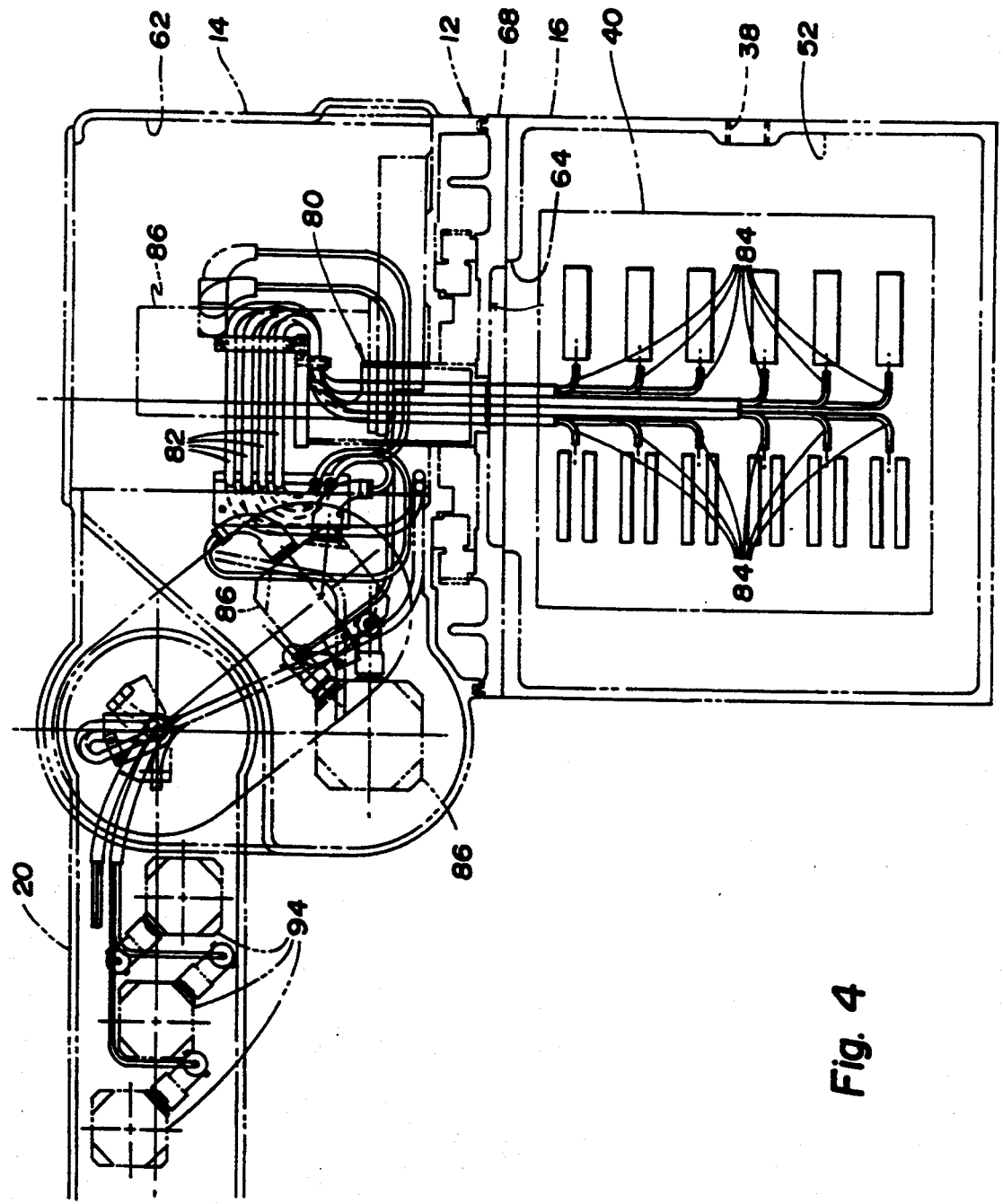
FIG. 4 is a side elevational view of the various cables of the robot wherein the outer housing structure of the robot is indicated by phantom lines.

Power and control signals for the robot 10 are carried by cables (not shown) which extend from a robot controller 28 located outside the paint spray booth. A pressurized conduit 30 houses the cables and is attached to the lower base section 16. The lower base section 16 is adapted to be connected to the pressurized conduit 30 by an adaptor plate 34 which, in turn, is mounted by bolts 32 on the front housing plate 36 of the lower base section 16. The cables contained in the conduit 30 extend through a passage 38 extending through the front wall 36 and are electrically connected or coupled to a terminal strip 40, as indicated in FIG. 4.

The adaptor plate 34 also includes an air inlet passage 42 which is in fluid communication with an air inlet tube 44, which also extends through the wall 26 of the paint spray booth to permit relatively clean air or inert gas to flow into the lower base section 16 from the ambient about the paint spray booth.

After flowing through the air inlet passage 42 the air flows through a tube 46 which is in fluid communication with an air pressure regulator 48. The regulator 48 is mounted to an inner wall 50 of the lower base section 16. The inner wall 50 defines an inner compartment 59 in the lower base section 16.

The pressure regulator 48 maintains the air pressure within a first compartment 52 within the lower base section 16 between predetermined limits. Also included within the first compartment 52 is a low pressure switch 54 which indicates a pressure within the first compartment 52 which is below the pressure that the pressure regulator 48 is designed to maintain. The pressure switch 54 is connected by means of a tube 56 to the non-pressurized compartment 59 at a connector 58 as an access to a reference atmosperic pressure level. The pressure switch 54 is also connected by a cable (not shown) to provide an alarm signal to the robot controller 28 to indicate that the robot 10 should be shut down due to the low pressure in the first compartment 52.

A pair of umbrella vents 60 are also provided between the first compartment 52 and the inner compartment 59 at the inner wall 50 to relieve any excess pressure generated by the pressure regulator 48 above a maximum predetermined limit. The umbrella vent 60 communicates the excess pressure from the first compartment 52 to the inner compartment 59.

Figure 5:
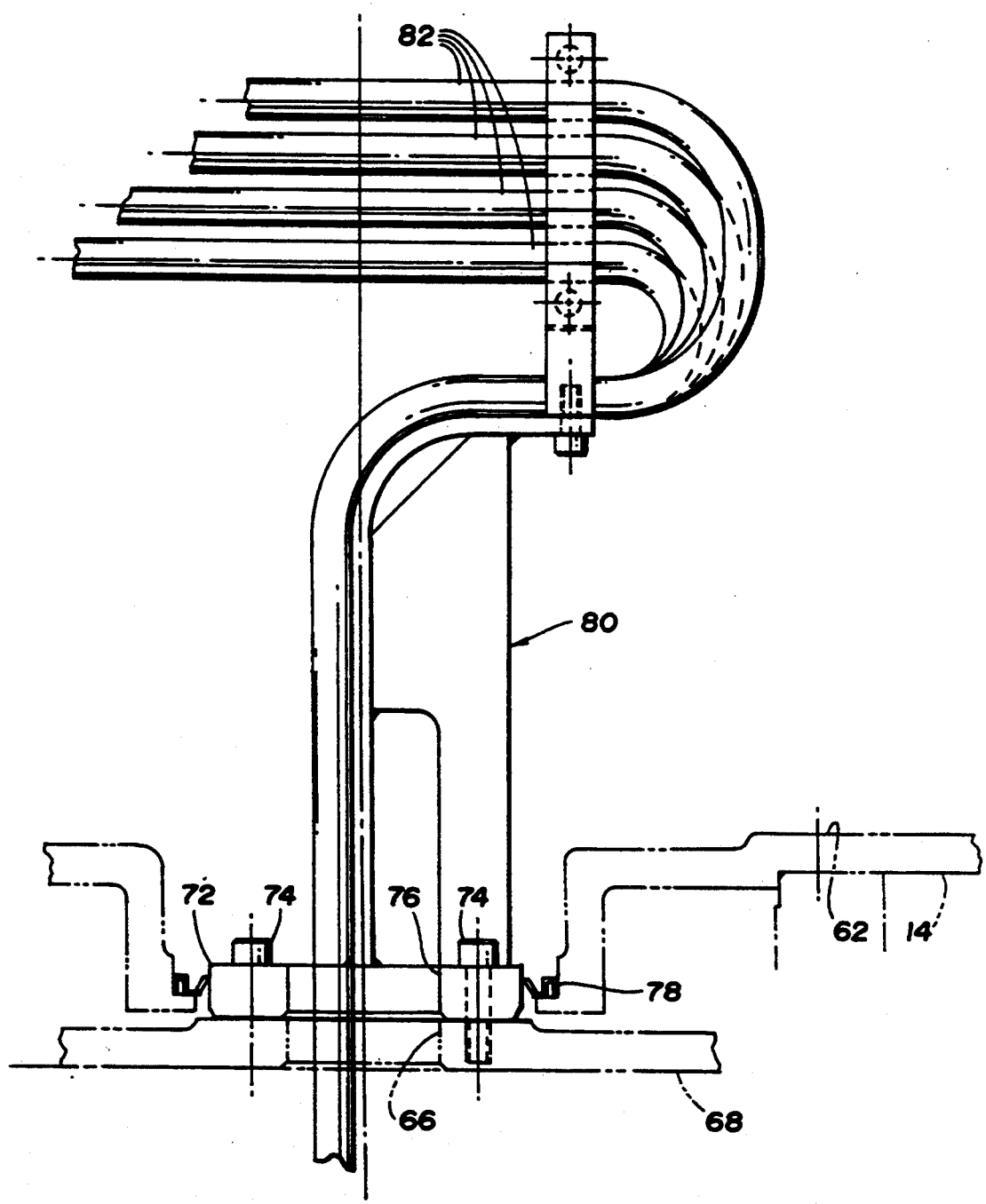
FIG. 5 is an enlarged view of a portion of FIG. 4 illustrating the sealing mechanism between the upper and lower sections of the base.

The first compartment 52 is in fluid communication with a second compartment 62 formed in the upper base section 14 through an opening 64 formed in the top wall of the lower base section 16. The opening 64 is aligned with an opening 66 formed in a drive plate 68 disposed between the upper and lower base sections 14 and 16, respectively. In turn, the opening 66 is aligned with an opening 76, formed in a collar member 72 which is bolted to the drive plate 68 by mounting bolts 74 as shown in FIG. 5. A circular seal 78 is provided between the collar member 72 and the lower wall of the upper base section 14 to seal the compartment 62 during relative rotation between the collar member 72 and its attached plate 68 and the upper base section 14.

Figure 6:
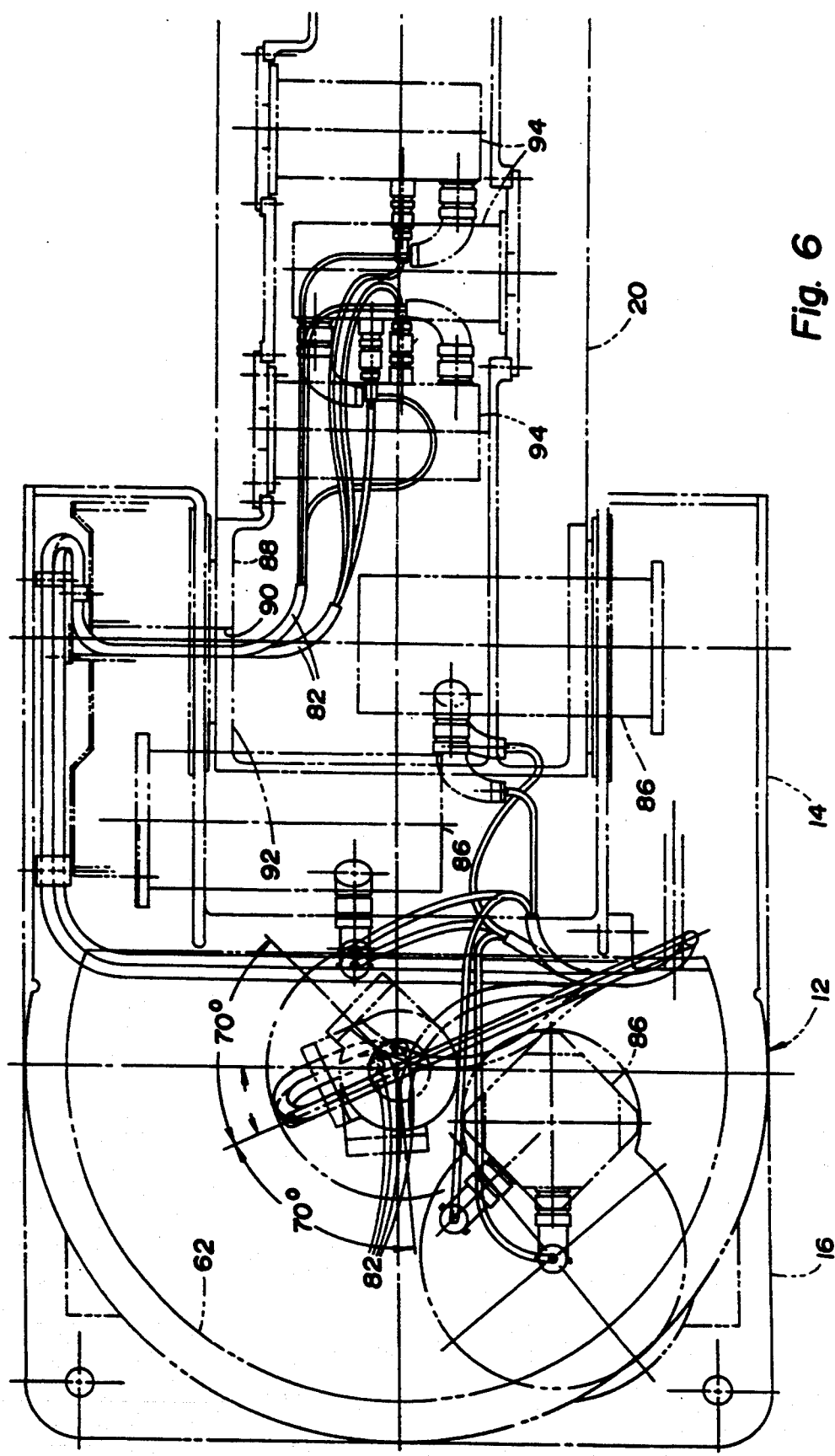
FIG. 6 is a top plan view of the cables of FIG. 4 wherein the various other components of the robot are illustrated in phantom.

A directing means or mechanism, generally indicated at 80, is fixedly mounted to the collar member 72 and supports a plurality of regular duty cables 82 which are electrically connected in the lower compartment 52 to the terminal strip 40. As shown in FIGS. 4 through 6, the cables 82 are relatively flexible to permit the cables 82 to be formed into a ribbon which, in turn, is bent along a relatively small radius of curvature. The cables are also flexible enough to permit flexing of the ribbon during relative rotation between the collar member 72 and its associated directing mechanism 80 and the upper base section 14.

Each cable 82 includes three smaller cables 84 contained therein. Two of the smaller cables 84 are provided for each electric drive motor 86 of an electric drive system mounted within the upper compartment 62. One of the smaller cables 84 provides the power signals and the other small cable provides the control signals. Three drive motors 86 are located in the upper compartment 62, one for each axis of rotation of the arm assembly 18. Each drive motor preferably comprises a non-sparking brushless servo motor, commonly known as A.C. servo motor or brushless D.C. motor.

Figure 7:
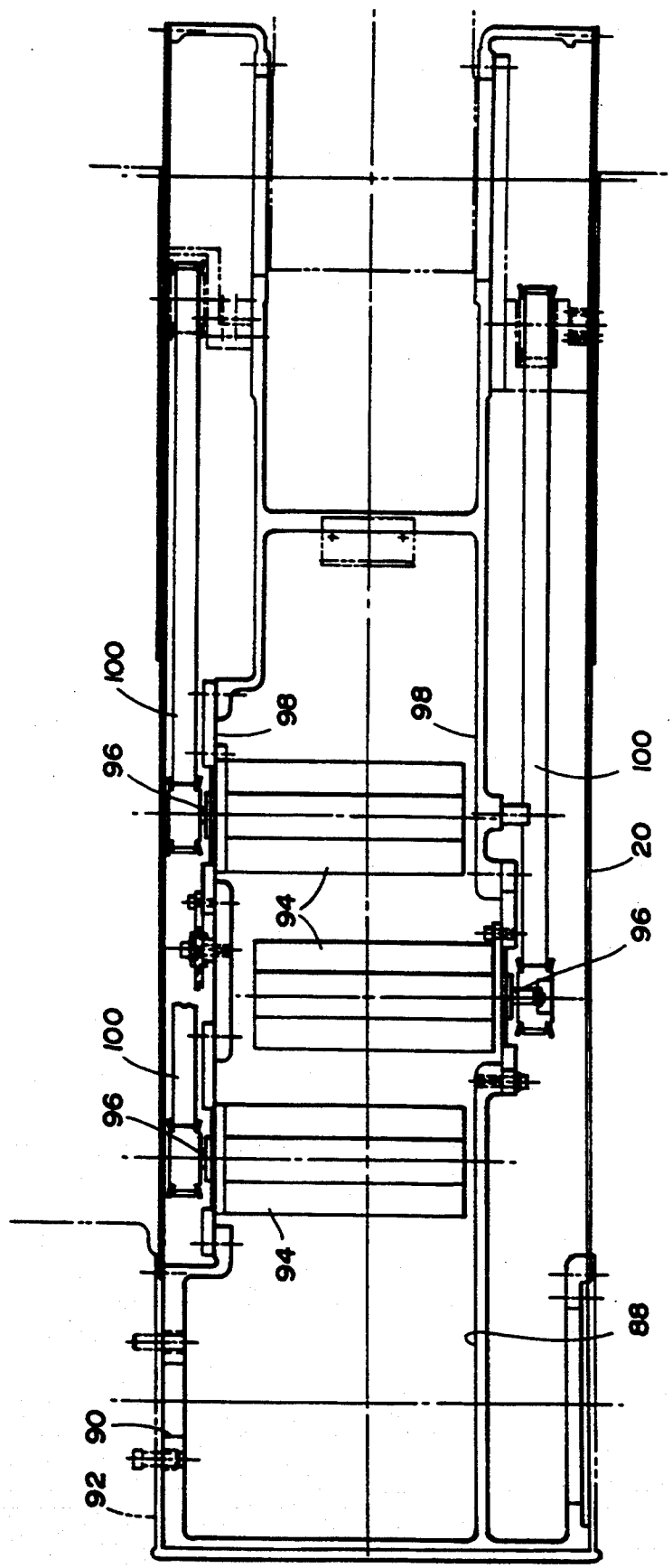
FIG. 7 is a broken-away, top plan view of an inner arm of the robot.

Two of the cables 82 are routed and clamped to extend into a third pressurized compartment 88 contained in the inner arm 20, as best shown in FIGS. 6 and 7. The cables extend from the second pressurized compartment 62 into the third pressurized compartment 88 through an opening 90 formed in the outer wall 92 of the inner arm 20 and in the outer wall of the upper base section 14. The cables 82 are electrically connected to their respective electric motors 94 which are mounted within the third compartment 88. As shown in each of FIGS. 4 and 6, each motor 94 is smaller than each motor 86. Additional details of the specific construction and operation of the ribbon of cables 82 are given in co-pending U.S. patent application entitled "Robot With Improved Cable Routing and Clamping", Attorney's Docket No. P-306 filed on even date with the present application, now U.S. Pat. No. 4,659,279 and having the same Assignee and which is hereby incorporated by reference.

Drive shafts 96 of the motors 94 extend through inner walls 98 which define the pressurized compartment 88 and are in driving engagement with their respective timing belts 100. Each timing belt 100 in turn, is operatively connected to its respective gear mechanism for driving a separate axis of the three-axis wrist mechanism 24 through hollow concentric drive tubes.

A number of purging vents (not shown) are also provided in the inner walls defining the compartments 52, 62 and 88 so that each of the compartments can be provided with clean air or an inert gas at sufficient flow and pressure to reduce to an acceptably safe level the concentration of any flammable gas or vapor which may have contaminated any or all of the compartments. The pressure regulator 48 includes a manual bypass to allow this purging process when desired.

Also, appropriate seals may be provided between the various moving and non-moving parts of the robot so that the positive pressure within the compartments 52, 62 and 88 can be maintained, without an excess of air flow.

The above construction allows the use of a relatively small and inexpensive electric robot in a hazardous environment such as can be found in a conventional paint spray booth. The pressurized compartments 52, 62 and 88 which either are in fluid communication with each other, or are individually pressurized, prevent flammable gases or vapors from entering into the compartments which house electrical equipment including the electric drive motors.

By providing the pressurized compartment 88 in the arm assembly 18, the amount of interconnecting gearing to drive the various axes of the wrist mechanism 24 is substantially reduced. Also, the use of non-sparking electric motors in the various pressurized compartments eliminates the need for relatively heavy and costly explosion-proof motors either within the robot 10 or attached on the exterior surface thereof. A further benefit of using the non-sparking electric motors within the pressurized compartments is that the cables providing the power and control signals to the electric motors may comprise regular duty cables and not heavy-duty explosion-proof cables which are not only more costly, but also are relatively inflexible compared to regular duty cables.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. In an electric drive type robot of the type intended for operation in an explosive atmosphere and including a plurality of electric drive motors and electric wiring for supplying electrical power to said motors, the improvement of antiexplosion means for preventing explosion of the explosive atmosphere by said electric drive motors and said electric wiring, said antiexplosion means comprising:
   a plurality of non-explosion-proof electric motors for said electric drive motors and non-explosion-proof electric wiring for said electric wiring flexibly connecting each of said electric drive motors to an electrical power source outside said explosive atmosphere;
   sealing means for enclosing said electric drive motors and said electric wiring from the explosive atmosphere; and
   pressurizing means for supplying sufficient inert gas into said sealing means for surrounding said motors and said wiring from a gas source outside said explosive atmosphere at a pressure above said explosive atmosphere sequentially to reduce by purging to an acceptable safe level the concentration of explosive gas which may have entered said sealing means, to maintain said sealing means at a pressure above said explosive atmosphere to prevent entry of said explosive gas and to compensate for any leakage from said sealing means.

2. An industrial robot for use in an atmosphere containing an inflammable or explosive gas, comprising:
   a robot assembly including a stationary robot component and a plurality of movable robot components, at least a part of said stationary robot component and said movable robot components having therein airtight chambers which communicate with each other;
   communicating means for communicating the chambers with each other;
   electric motors for driving and moving said movable robot components, said motors disposed within at least two of said airtight chambers;
   a programmable controller for supplying electric power to said motors and for controlling said motors in accordance with a predetermined program, said controller disposed outside of said atmosphere of inflammable or explosive gas and electrically connected to said motors through electric cables arranged in said airtight chambers and a conduit connected to said stationary robot component; and
   as supply means connected to at least one of said airtight chambers for supplying inert gas to said chambers from a gas source outside said atmosphere of inflammable or explosive gas at a pressure above the pressure of said atmosphere to compensate for any leakage from said chambers and prevent the entrance of gases from said atmosphere to said chambers while the inert gas being supplied surrounds the motors and the cables in said chambers and said conduit, whereby to obviate the need that said motor and said wiring be heavy and explosion-proof so that the movable robot components may be compact and lightweight.

3. The method of electrically driving a plurality of relatively movable, compartmented robot parts in a hazardous environment by a lightweight, non-explosion-proof electric motor in the compartment of at least one of the robot parts being driven, characterized by the steps of:
   providing that said compartment be substantially airtight when such compartmented robot parts are movable relative to each other;
   supplying sufficient inert gas to said compartment from a gas source outside said hazardous environment at a pressure above the pressure of said hazardous environment sequentially to reduce by purging to an acceptable level the concentration of hazardous gas which may have entered said compartment, to maintain said compartment at a pressure above said hazardous environment to prevent entry of said hazardous environment and to compensate for any leakage from said compartment while the inert gas being supplied surrounds the motor in said compartment, whereby to obviate the need that said motor be heavy and explosion-proof so that the robot parts may be compact and lightweight, wiring be heavy and explosion-proof so that the robot parts may be further compact and lightweight.

4. A compact, lightweight electrically driven robot adapted for use in a hazardous environment and to be controlled from outside said hazardous environment, comprising:
   a base defining an airtight first compartment and having an outer stationary surface;
   a first drive mechanism including at least one non-explosion-proof electric motor received within the airtight first compartment;
   an arm assembly mounted for movement relative to the base, and driven by the first drive mechanism, the arm assembly having an airtight second compartment;
   a second drive mechanism including at least one non-explosion-proof electric motor within the second compartment defined by the arm assembly;
   a wrist mechanism mounted on the arm assembly and driven by the second drive mechanism;
   a cable conduit extending from outside said hazardous environment to the airtight first compartment;
   a plurality of non-explosion-proof cables housed within said cable conduit extending into said airtight first compartment, at least one of said cables being flexible and connected to the first drive mechanism to operate the electric motor thereof, and at least another of said cables being flexible and extending from the airtight first compartment of the base to the airtight second compartment of the arm assembly and being connected to the second drive mechanism to operate the electric motor thereof;
   said non-explosion-proof cables being sufficiently flexible to accommodate the movement of said arm assembly relative to the base;
   a pressurized gas supply for feeding pressurized gas into the airtight compartments and into said cable conduit to provide pressurized gas that surrounds the electric motors in their respective compartments and the cables housed in the cable conduit, said gas supply being attached to the outer surface of the base;

sealing means cooperating between the base, the arm assembly and the cable conduit to maintain the compartments airtight and the pressurized gas surrounding the non-explosion-proof electric motors and cables whereby the robot is capable of operating in the hazardous environment; and communicating means fluidly communicating the first and second compartments, said pressurized gas supply feeding sufficient pressurized gas through said communicating means to prevent gases from said hazardous environment from entering said compartments and said cable conduit, whereby to obviate the need that said electric motors and said cables be explosion-proof so that the robot may be compact and light-weight, said gas supply being outside said cable conduit.

5. A robot assembly comprising:

a stationary base defining a substantially airtight first compartment having an outer surface;

an enclosure defining a substantially airtight second compartment and mounted for rotational movement on the base;

an arm assembly mounted for rotational movement on the enclosure and defining at least one substantially airtight compartment wherein the airtight compartments are successively mounted for rotational movement relative to each other and fluid communication therebetween;

a set of drive mechanisms, each set including at least one electric motor received in one or more of said compartments for effecting rotational movement of one compartment relative to another;

a conduit extending to the base and communicated to the first compartment, said conduit being attached to the outer surface of the base;

a cable bundle extending from a robot controller, through the conduit and into the airtight first compartment of the base, the cable bundle having at least one cable connected to each set of drive mechanisms to operate the electric motor therein, and said cable bundle including at least one other cable that extends from the airtight first compartment of the base into the airtight second compartment and to each compartment in the arm assembly for connection to the drive mechanism to operate the electric motor thereof;

communicating means for fluidly communicating the first and second compartments, and the second and the at least one compartment of the arm assembly successively; and a pressurized gas supply means connected to said base that feeds pressurized gas into the airtight first compartment of the base and thence into the conduit and the airtight second compartment of the enclosure and to the at least one compartment of the arm assembly.

6. The robot of claim 5 wherein the gas supply is outside said conduit.

7. The method of electrically driving a plurality of relatively movable robot parts to manipulate said robot parts in a hazardous environment comprising the steps of:

providing a substantially airtight compartment in more than one of said robot parts so that such airtight compartments are movable relatively to each other;

locating a lightweight non-explosion-proof motor for driving one of said robot parts in the airtight compartment next closest to the robot part being driven;

supplying electrical power to said motor from a power source outside said hazardous environment by means of flexible, lightweight, non-explosion-proof wiring so that said wiring can flex when said robot parts are moving relatively;

housing said wiring in a substantially airtight conduit from said power source outside said hazardous environment which is in fluid flow communication with the airtight compartment in which said motor is located; and supplying sufficient non-ignitable gas to said compartment and said conduit from a gas source outside said hazardous environment at a pressure above the pressure of said hazardous environment to compensate for any leakage from said compartment and prevent the entrance of gases from said hazardous environment to said compartment and said conduit while the non-ignitable gas being supplied surrounds the motor in said compartment and the wiring at said conduit, whereby to obviate the need that said motor and said wiring be heavy and explosion-proof so that the robot parts may be compact, lightweight and easily balanced; said step of supplying such non-ignitable gas being individually to said compartments whereby to individually pressurize each compartment containing electrical equipment therein.

8. An electric robot for use in a hazardous environment, including a base and an arm assembly supported for movement on said base, the base and the arm assembly forming a plurality of compartments including at least two relatively movable compartments including electric motors and cables extending from outside said hazardous environment to the electric motors, characterized in that the compartments are connected to each other by openings, means for pressurizing the compartments at a pressure above said hazardous environment, purging means for purging the compartments with clean air or an inert gas and a pressure regulator for regulating the pressure between predetermined limits, and sealing means arranged between the compartments for withstanding the excess pressure.

* * * * *

UNITED STATES PATENT AND TRADEMARK OFFICE
CERTIFICATE OF CORRECTION

PATENT NO. : 5,421,218
DATED : June 6, 1995
INVENTOR(S) : Hadi A. Akeel, et al.

It is certified that error appears in the above-indentified patent and that said Letters Patent is hereby corrected as shown below:

Col. 7, line 62, claim 2, before "supply" delete "as" and insert --gas--.

Col. 8, line 30, claim 3, after "weight," insert --supplying electrical power to said motor from a power source outside said hazardous environment by means of flexible, lightweight non-explosion-proof wiring so that said wiring can flex when said robot parts are moving relatively;

housing said wiring in a substantially airtight conduit from said power source outside said hazardous environment which is in fluid flow communication with the airtight compartment in which said motor is located; and

UNITED STATES PATENT AND TRADEMARK OFFICE
CERTIFICATE OF CORRECTION

PATENT NO. : 5,421,218
DATED : June 6, 1995
INVENTOR(S) : Hadi A. akeel, et. al.

It is certified that error appears in the above-indentified patent and that said Letters Patent is hereby corrected as shown below:

supplying sufficient inert gas to said conduit at a gas pressure above the pressure of said hazardous environment to prevent the entrance of gases from said hazardous environment to said conduit while the inert gas being supplied surrounds the wiring at said conduit, whereby to obviate the need that said --.

Signed and Sealed this

Twenty-sixth Day of September, 1995

Attest:

BRUCE LEHMAN

*Attesting Officer*    *Commissioner of Patents and Trademarks*